(12) United States Patent
Wu

(10) Patent No.: US 8,305,901 B2
(45) Date of Patent: Nov. 6, 2012

(54) METHOD OF GENERATING A BUFFER STATUS FOR A WIRELESS COMMUNICATION SYSTEM AND RELATED DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 631 days.

(21) Appl. No.: 12/234,714

(22) Filed: Sep. 22, 2008

(65) Prior Publication Data

US 2010/0074168 A1 Mar. 25, 2010

(51) Int. Cl.
*H04L 12/26* (2006.01)
(52) U.S. Cl. ............... 370/236.2; 370/412; 455/331
(58) Field of Classification Search ............... 370/412, 370/413, 229–236, 252, 253, 241.1, 310, 370/331
See application file for complete search history.

(56) References Cited

U.S. PATENT DOCUMENTS

| | | | |
|---|---|---|---|
| 7,792,130 B2 * | 9/2010 | Fischer ................... | 370/412 |
| 2008/0069053 A1 * | 3/2008 | Kim et al. ............... | 370/332 |
| 2008/0298322 A1 * | 12/2008 | Chun et al. .............. | 370/335 |
| 2009/0238142 A1 * | 9/2009 | Chun et al. .............. | 370/331 |
| 2010/0177733 A1 * | 7/2010 | Yi et al. ................. | 370/331 |

FOREIGN PATENT DOCUMENTS

| | | |
|---|---|---|
| CN | 1937472 A | 3/2007 |
| WO | 2009045871 A2 | 4/2009 |

OTHER PUBLICATIONS

NTT Docomo, Inc.,"PDCP actions at RLC re-establishment", Aug. 18-22, 2008, 3GPP TSG RAN WG2 #63 , R2-084487, XP050319537, Jeju, South Korea.
3GPP, 3GPP TS 36.331 V8.2.0 "Evolved Universal Terrestrial Radio Access (E-UTRA) Radio Resource Control (RRC) Protocol specification", May 2008.
3GPP, 3GPP TS 36.321 V8.2.0 (May 2008) "Medium Access Control (MAC) protocol specification".
3GPP, 3GPP TSG-RAN2 Meeting #62 R2-082849, May 2008.
3GPP, 3GPP TS 36.323 V8.2.1 (May 2008), "Evolved Universal Terrestrial Radio Access (E-UTRA); Packet Data Convergence Protocol (PDCP) specification".
3GPP, 3GPP TS 36.322 V8.1.0 (Mar. 2008) "Evolved Universal Terrestrial Radio Access (E-UTRA) Radio Link Control (RLC) protocol specification".
Office action mailed on May 17, 2011 for the China application No. 200910178610.X, filing date Sep. 22, 2009, p. 1-7.

* cited by examiner

*Primary Examiner* — Gary Mui
(74) *Attorney, Agent, or Firm* — Winston Hsu; Scott Margo

(57) ABSTRACT

A method of generating a buffer state of a packet data convergence protocol, hereinafter called PDCP, layer for a user equipment in a wireless communication system includes including volume information of packets, which have been submitted to a layer lower than the PDCP layer and have not been confirmed by the layer or by a PDCP status report, in a buffer state report of the PDCP layer, where the packets have not been confirmed by the layer due to buffer clearing of the layer.

14 Claims, 4 Drawing Sheets

METHOD OF GENERATING A BUFFER STATUS FOR A WIRELESS COMMUNICATION SYSTEM AND RELATED DEVICE

BACKGROUND OF THE INVENTION

1. Field of the Invention

The present invention relates to a method and communication device utilized in a wireless communication system, and more particularly, to a method and communication device utilized in the wireless communication system for generating a buffer status of a packet data convergence protocol (PDCP) layer.

2. Description of the Prior Art

As today's applications for electronic systems grow at ever-increasing rates, the demand for better communications performance is never ceasing. Standards for various technologies such as the 3rd Generation Partnership Project (3GPP) High-Speed Packet Access (HSPA) and Long Term Evolution (LTE) work towards creating more efficient communication systems.

For example, dynamic resource allocation for uplink (UL) transmissions has been introduced into the medium access control (MAC) layer standard, for communicating between a user equipment (UE) such as a mobile station or a mobile handset, and an Evolved Universal Terrestrial Radio Access Network (E-UTRAN) including evolved base stations (eNBs).

Dynamic resource allocation utilizes radio resources more efficiently, where radio resources are allocated only when the UE has data to transmit. The E-UTRAN schedules UE transmission based on UE buffer status. The UE buffer status reporting has a great impact on efficiency of overall radio source usage arranged by E-UTRAN. Reporting more data volume than actual data volume in the buffer makes unnecessary uplink transmission and consumes UE power. Reporting less data volume than actual data volume in the buffer makes the UE inevitably request for more resources to be allocated and wait for the uplink resource allocation, and this causes a delay before the UE data can be transmitted, slowing down the overall communication between the UE and the E-UTRAN.

In striving for faster and better communications and efficient usage of radio resource in our wireless communications systems, the unnecessary uplink resource allocation and uplink transmission delay should be alleviated.

A PDCP (packet data convergence protocol) layer of the UE provides data transfer services (e.g. radio bearer transfer) to an RRC (radio resource control) layer and data protocol layers (e.g. Internet Protocol), and exchanges packets of a UM (unacknowledged mode) and AM (acknowledged mode) mode of an RLC (radio link control) layer.

The Buffer Status reporting procedure is used to provide the serving eNB with information about the amount of data in the UL buffers of the UE. The Buffer Status Report is defined as a MAC (Medium Access Control) Control Element including all data that is available for transmission in the RLC layer and in the PDCP layer. A Buffer Size field in the Buffer Status Report MAC Control Element identifies the total amount of data available across all logical channels of a logical channel group after a MAC PDU has been built. The amount of data is indicated in number of bytes.

For the purpose of MAC buffer status reporting, the UE shall consider the following as data available for transmission in the PDCP layer:

the SDUs for which no PDU has been submitted to lower layers:
the SDU itself, if the SDU has not yet been processed by PDCP, or
the control or data PDU if the SDU has been processed by PDCP.

In addition, for radio bearers that are mapped on the RLC AM, if the PDCP entity has previously received an indication that a handover has occurred, the UE shall also consider the following as data available for transmission in the PDCP layer:

For SDUs for which a corresponding PDU has only been submitted to lower layers before PDCP has received an indication that a handover has occurred, and for which the successful delivery has not been confirmed by lower layers or by a PDCP status report:
the SDU, if it has not yet been processed by PDCP, or
the PDU (data only) once it has been processed by PDCP.

When RRC connection re-establishment occurs, the RLC is re-established, and the RLC entity discards all RLC SDUs and RLC AMD (AM data) PDUs at the transmitting side. In other words, all data buffered in RLC for transmission are deleted. When a data radio bearer (DRB) mapped to RLC AM is resumed after the RRC connection re-establishment, the buffer status report only includes data below in the PDCP entity of the DRB.

For SDUs for which no PDU has been submitted to lower layers:
the SDU itself, if the SDU has not yet been processed by PDCP, or
the PDU (control or data) if the SDU has been processed by PDCP.

As can be seen from the above, the buffer status report does not include the PDCP PDUs that have been submitted to RLC but have not been confirmed by RLC for successful transmission before RRC connection re-establishment. Those PDCP PDUs may need to be retransmitted are not reported. As a result, the E-UTRAN cannot know a correct buffer data volume of the UE and therefore cannot precisely allocate UL grant.

For example, a PDCP entity has submitted all data of a DRB to a RLC AM entity and no data has been sent by RLC AM successfully due to radio link failure. When the DRB is resumed after the RRC connection re-establishment, the buffer status report includes no data in buffer since all data in the RLC buffer has been cleared. In this situation, the E-UTRAN does not allocate any UL grant for transmission to the UE according to the buffer status report.

The same abovementioned situation also occurs in a RLC indication in which the maximum number of retransmissions has been reached or a handover failure is seen.

SUMMARY OF THE INVENTION

The present invention therefore provides a method of generating a buffer status of a PDCP layer for a UE of a wireless communication system and related communication device that can avoid imprecise uplink grant allocation of a network.

The present invention discloses a method of generating a buffer status of a PDCP layer for a UE in a wireless communication system comprises including volume information of packets, which have been submitted to a layer lower than the PDCP layer and have not been confirmed by the layer or by a PDCP status report, in a buffer status report, where the packets have not been confirmed by the layer due to buffer clearing of the layer.

The present invention further discloses a communication device of a wireless communication system for accurately generating a buffer status of a PDCP layer. The communication device includes a processor, a communication interfacing unit, a control unit and a computer readable recording medium. The processor is used for processing storage data. The communication interfacing unit is used for exchanging signals with a peer communication device of the wireless communication system. The control unit is coupled to the processor and communication interfacing unit, and used for controlling the communication interfacing unit and the communication device according to processing results of the processor. The computer readable recording medium is coupled to the processor and used for storing the storage data. The storage data includes program code for including volume information of packets, which have been submitted to a layer lower than the PDCP layer and have not been confirmed by the layer or by a PDCP status report, in a buffer status report, where the packets have not been confirmed by the layer due to buffer clearing of the layer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
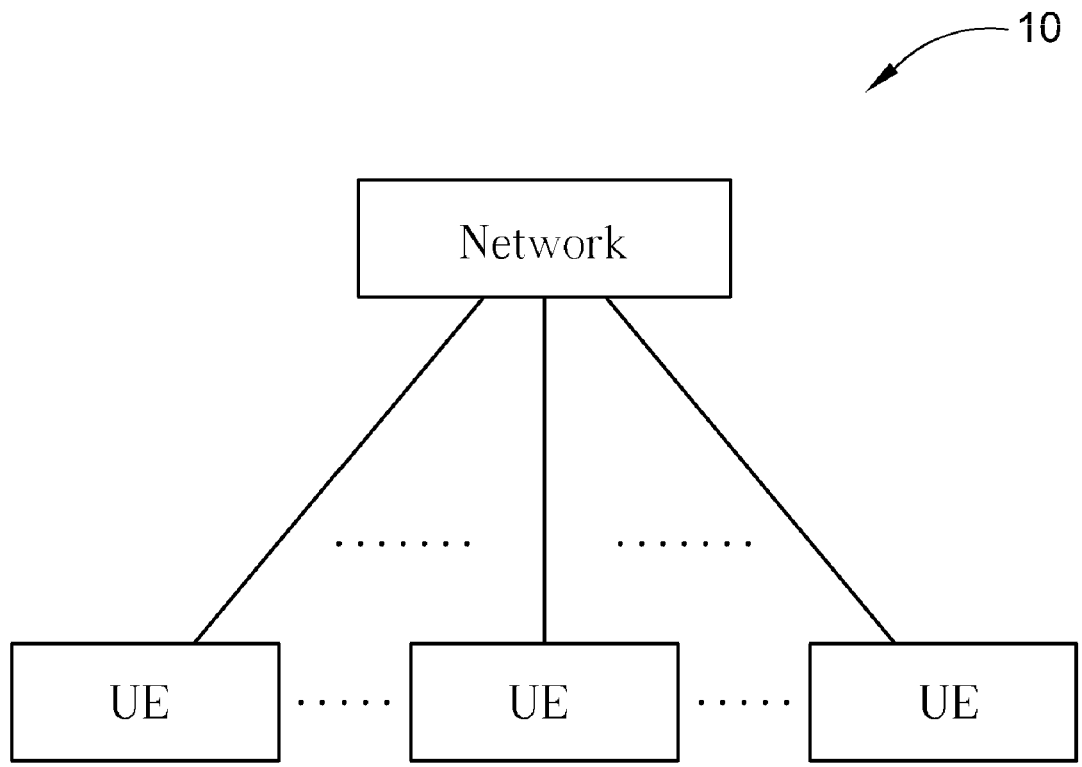
FIG. 1 is a schematic diagram of a wireless communication system.

Please refer to FIG. 1, which illustrates a schematic diagram of a wireless communication system 10 according to an embodiment of the present invention. The wireless communication system 10 is an LTE (long-term evolution) system or other mobile communication systems, and is briefly composed of a network and a plurality of UEs. In FIG. 1, the network and the UEs are simply utilized for illustrating the structure of the wireless communication system 10. Practically, the network EUTRAN (evolved-UTAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
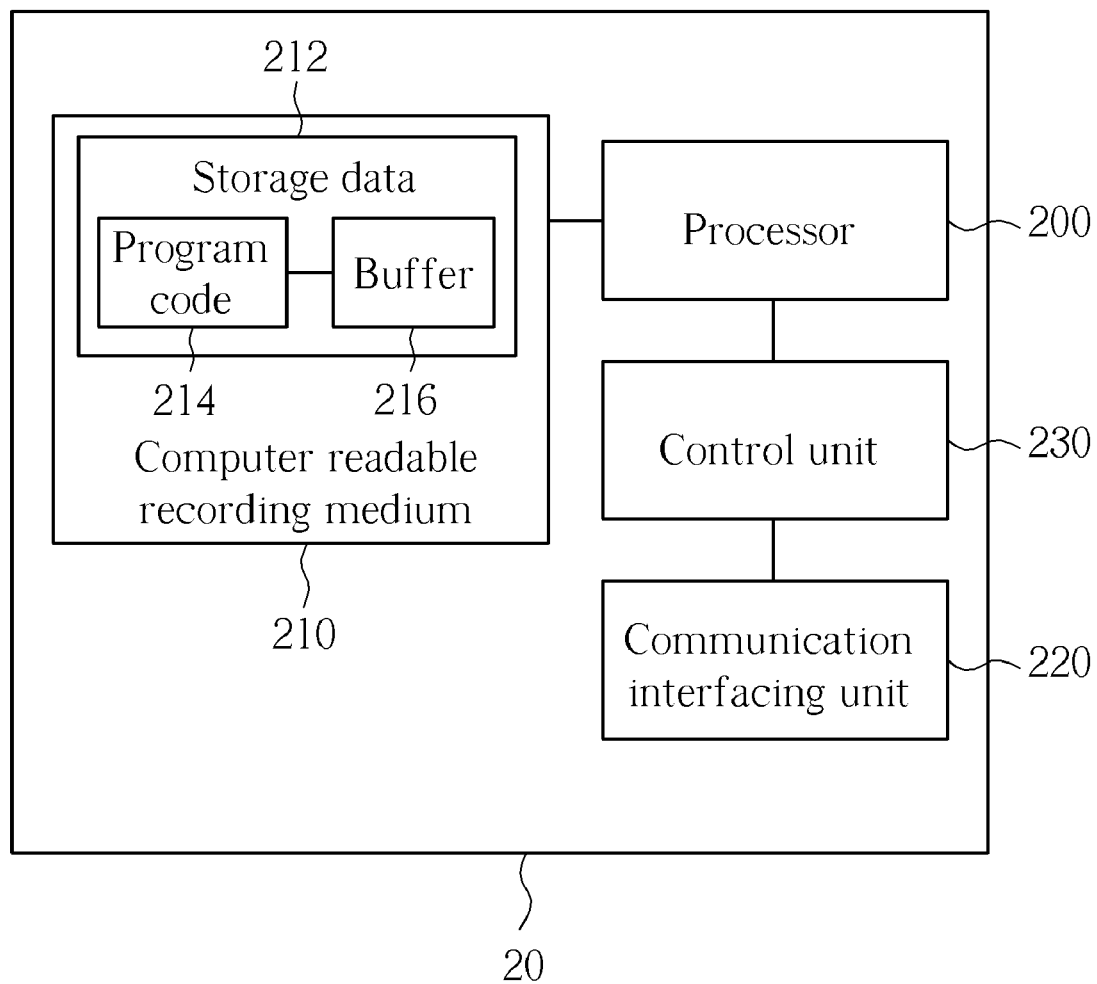
FIG. 2 is a schematic diagram of a communication device according to embodiments of the present invention.

Please refer to FIG. 2, which illustrates a schematic diagram of a communication device 20 according to embodiments of the present invention. The communication device 20 can be the UE shown in FIG. 1 and includes a processor 200, a computer readable recording medium 210, a communication interfacing unit 220 and a control unit 230. The computer readable recording medium 210 is any data storage device that stores storage data 212, including program code 214 and a buffer 216, thereafter read and processed by the processor 200. Examples of the computer readable recording medium 210 include a subscriber identity module (SIM), read-only memory (ROM), random-access memory (RAM), CD-ROMS, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 3:
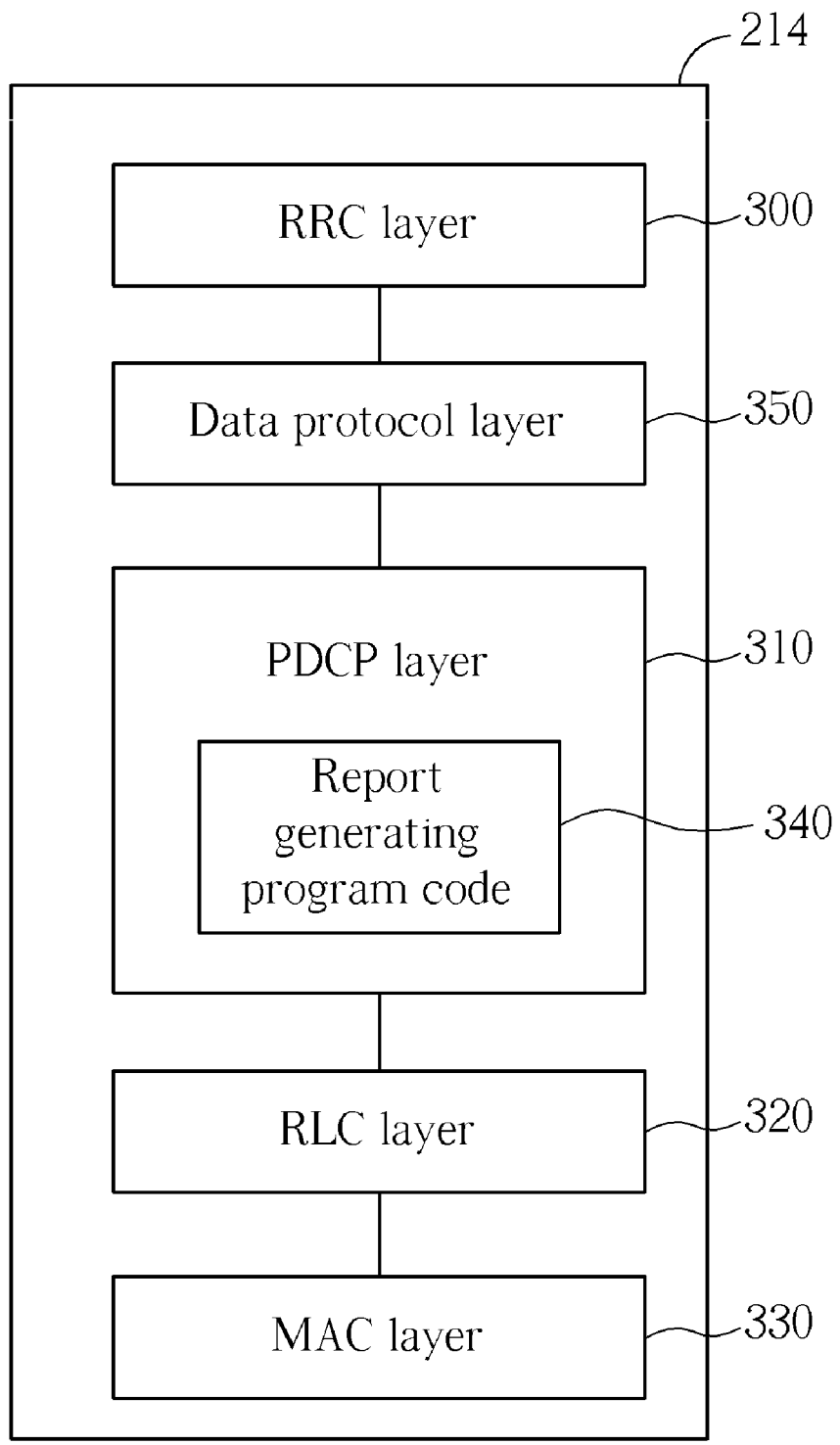
FIG. 3 is a schematic diagram of the program code according to FIG. 2.

Please refer to FIG. 3, which illustrates a schematic diagram of the program code 214 according to embodiments of the present invention. The program code 214 includes program code of multiple communications protocol layers, which from top to bottom are a radio resource control (RRC) layer 300, a data protocol layer 350, a packet data convergence protocol (PDCP) layer 310, a radio link control (RLC) layer 320 and a medium access control (MAC) layer 330. The RRC layer 300 can establish an RRC connection with the network. According to the communication quality requirement and configuration indicated by the network, the RRC layer 300 may perform RRC connection, reconfiguration, or releasing, whereas the RLC layer 320 may perform RLC reset or re-establishment. When the RRC connection re-establishment is performed, the RLC re-establishment is performed as well.

For uplink, the PDCP layer 310 receives radio bearer data, i.e. PDCP service data units (SDUs), from the data protocol layer 350, and thereby performs header compression and ciphering. The PDCP layer 310 further adds PDCP headers to generate PDCP PDUs. The PDCP layer 310 stores the above-mentioned PDCP PDUs and SDUs in the buffer 216. The PDCP PDUs are submitted to the RLC layer 320 and finally sent to the network after necessary processes performed by lower layers, such as the RLC layer 320 and the MAC layer 330.

Figure 4:
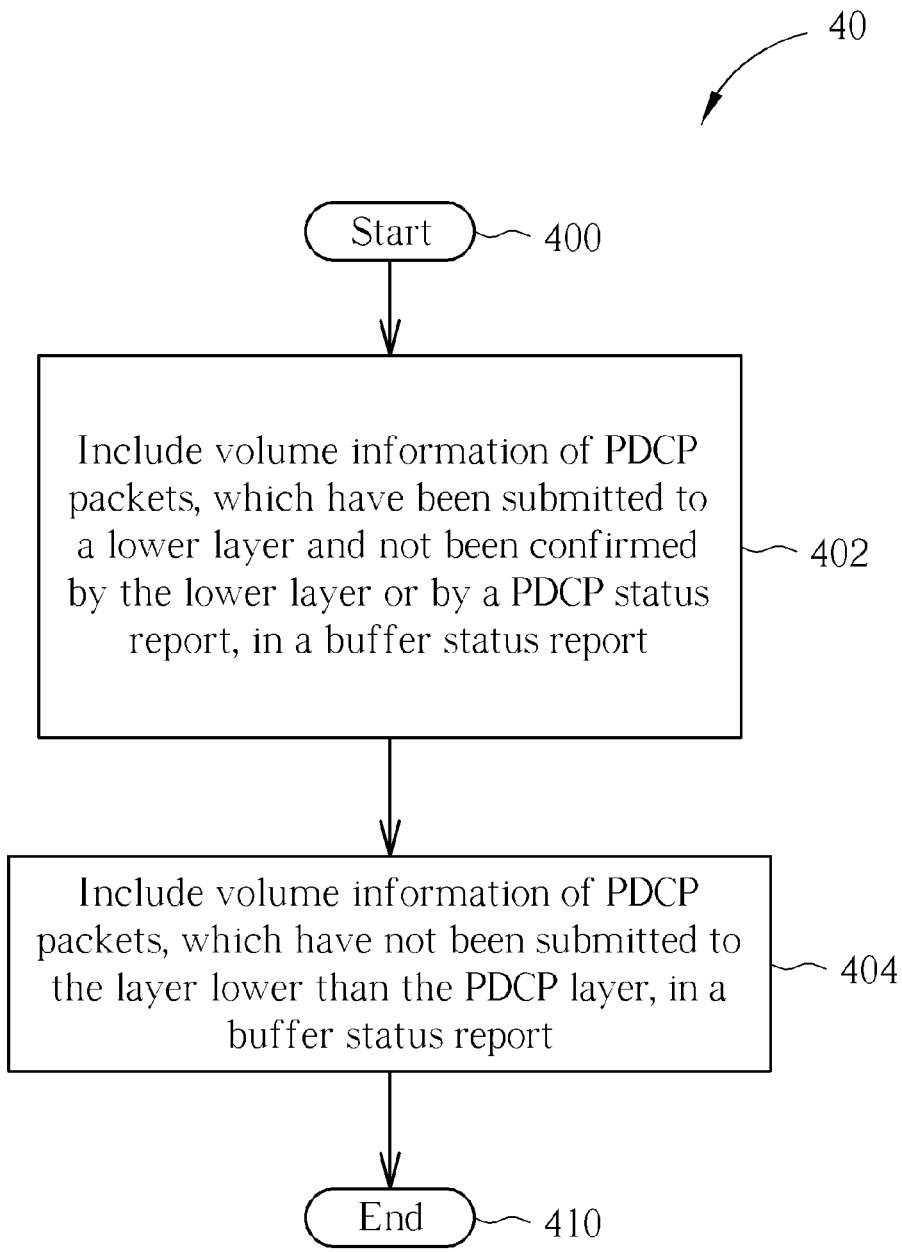
FIG. 4 is a flowchart of a report generating process according to an embodiment of the present invention.

For uplink grant allocation, the communication device 20 reports buffer status of the PDCP layer 310 and the RLC layer 320. The network allocates an uplink grant for the communication device 20 to use according to the reported buffer status. The concept of the present invention focuses on buffer status reporting of the PDCP layer, and thus detailed buffer status reporting of the RLC layer 320 is not discussed herein. In this situation, the embodiment of the present invention provides a report generating program code 340 to avoid imprecise uplink grant allocation of a network. Please refer to FIG. 4, which illustrates a flowchart of a report generating process 40 according to an embodiment of the present invention. The report generating process 40 is utilized for a UE to generating a buffer status of a PDCP layer and can be compiled into the report generating program code 340. The report generating process 40 includes the following steps:

Step 400: Start.

Step 402: Include volume information of PDCP packets, which have been submitted to a lower layer and not been confirmed by the lower layer or by a PDCP status report, in a buffer status report.

Step 404: Include volume information of PDCP packets, which have not been submitted to the layer lower than the PDCP layer, in a buffer status report.

Step 410: End.

In the process 40, the PDCP packets have not been confirmed by the layer due to buffer clearing of the lower layer. According to the report generating process 40, the UE includes three pieces of the volume information in the buffer status report as follow: (1) the PDCP packets have been submitted to the lower layer and have not been confirmed by the lower layer due to the buffer clearing of the layer, (2) the PDCP packets have been submitted to the lower layer of the PDCP layer and have not been confirmed by the PDCP status report, and (3) the PDCP packets have not been submitted to the lower layer. The PDCP packets of (3) includes PDCP SDUs, which have not yet been processed by the PDCP layer, and control or data PDCP PDUs whose PDCP SDUs have been processed by the PDCP layer.

Preferably, the packets of (1) and (2) are PDCP SDUs or PDUs. The packets of (1), (2) and (3) belong to a PDCP entity of the PDCP layer. The lower layer is an RLC layer (i.e. the RLC layer 320). The buffer clearing is caused by a RLC re-establishment or an RRC connection re-establishment. The buffer status of the PDCP layer is further included in a MAC control element including buffer status of the PDCP and RLC layers. The buffer status report is a regular, a periodic, or a padding buffer status report.

In the prior, the UE does not count in the PDCP packets of (1) and (2) in the buffer status report when an RLC re-establishment just recently happens. In this situation, an overall buffer status for the PDCP and RLC layers is imprecise since the PDCP packets, which have been submitted to the RLC layer and have not been confirmed by the RLC layer or by the PDCP status report, have been already cleared before the buffer status report is triggered. In other words, the overall buffer status does not count in the volume information of the PDCP packets, which have been submitted to the RLC layer and have not been confirmed by the RLC layer or the PDCP status report.

Compared to the prior art, the PDCP buffer status includes the volume information of the PDCP packets, which have been submitted to the RLC layer and have not been confirmed by the RLC layer or the PDCP status report, to make the overall buffer status precise. Thus, the embodiment of the present invention can avoid imprecise uplink grant allocation due to an imprecise buffer status report.

Those skilled in the art will readily observe that numerous modifications and alterations of the device and method may be made while retaining the teachings of the invention.

What is claimed is:

1. A method of generating a buffer status of a packet data convergence protocol, hereinafter called PDCP, layer for a user equipment in a wireless communication system, the method comprising:
    including volume information of packets, which have been submitted to a radio link control, hereinafter called RLC, layer and have not been confirmed by the RLC layer due to buffer clearing of the RLC layer of the user equipment, or have not been confirmed by a PDCP status report, in a buffer status report defined as a MAC (Medium Access Control) control element wherein a buffer size field in the Buffer Status Report MAC Control Element identifies the total amount of data available across all logical channels of a logical channel group after a MAC PDU has been built;
    wherein the buffer clearing of the RLC layer of the user equipment is caused by a re-establishment of the RLC layer or a radio resource control (RRC) connection re-establishment.

2. The method of claim 1, wherein the packets are service data units, hereinafter called SDUs.

3. The method of claim 1, wherein the packets are protocol data units, hereinafter called PDUs.

4. The method of claim 1, further comprising including volume information of packets, which have not been submitted to the RLC, in the buffer status report.

5. The method of claim 4, wherein the packets, which have not been submitted to the RLC layer, comprises SDUs, which have not yet been processed by the PDCP layer, or control or data PDUs whose SDUs have been processed by the PDCP layer.

6. The method of claim 1, wherein the packets belong to a PDCP entity of the PDCP layer.

7. The method of claim 1, wherein the buffer status report is a regular buffer status report, a periodic buffer status report, or a padding buffer status report.

8. A communication device of a wireless communication system for accurately generating a buffer status of a packet data convergence protocol, hereinafter called PDCP, layer, the communication device comprising:
    a processor for processing storage data;
    a communication interfacing unit for exchanging signals with a peer communication device of the wireless communication system;
    a control unit coupled to the processor and communication interfacing unit, for controlling the communication interfacing unit and the communication device according to processing results of the processor; and
    a computer readable recording medium coupled to the processor, for storing the storage data;
    wherein the storage data comprises:
        program code for including volume information of packets, which have been submitted to a radio link control, hereinafter called RLC, layer and have not been confirmed by the RLC layer due to buffer clearing of the RLC layer of a user equipment, or have not been confirmed by a PDCP status report, in a buffer status report defined as a MAC (Medium Access Control) control element wherein a buffer size field in the Buffer Status Report MAC Control Element identifies the total amount of data available across all logical channels of a logical channel group after a MAC PDU has been built;
    wherein the buffer clearing of the RLC layer of the user equipment is caused by a re-establishment of the RLC layer or a radio resource control (RRC) connection re-establishment.

9. The communication device of claim 8, wherein the packets are service data units, hereinafter called SDUs.

10. The communication device of claim 8, wherein the packets are protocol data units, hereinafter called PDUs.

11. The communication device of claim 8, further comprising including volume information of packets, which have not been submitted to the RLC layer in the buffer status report.

12. The communication device of claim 11, wherein the packets, which have not been submitted to the RLC layer comprises SDUs, which have not yet been processed by the PDCP layer, or control or data PDUs whose SDUs have been processed by the PDCP layer.

13. The communication device of claim 8, wherein the packets belong to a PDCP entity of the PDCP layer.

14. The communication device of claim 8, wherein the buffer status report is a regular buffer status report, a periodic buffer status report, or a padding buffer status report.

* * * * *